United States Patent [19]
Deni et al.

[11] Patent Number: 5,845,562
[45] Date of Patent: Dec. 8, 1998

[54] ELECTRIC GRILL

[75] Inventors: Leonard A. Deni, E. Amherst; Joseph A. Deni, SE. Amherst, both of N.Y.

[73] Assignee: Keystone Mfg. Co., Inc., N.Y.

[21] Appl. No.: 54,699

[22] Filed: Apr. 3, 1998

[51] Int. Cl.[6] .................................................. A47J 37/06
[52] U.S. Cl. .................. 99/375; 99/380; 99/400; 99/425; 99/446; 219/386; 219/521
[58] Field of Search .............................. 99/372, 375, 380, 99/400, 401, 447, 425, 445, 444–446, 376–384, 373, 374; 219/401, 524, 525, 415, 521, 386, 461; 126/369, 20; 426/523

[56] References Cited

U.S. PATENT DOCUMENTS

| | | | |
|---|---|---|---|
| 2,321,676 | 6/1943 | Hennessy | 99/425 |
| 3,369,481 | 2/1968 | Pappas | 99/445 |
| 3,593,648 | 7/1971 | Walters | 99/349 |
| 3,664,256 | 5/1972 | Peirce | 99/425 |
| 3,719,507 | 3/1973 | Bardeau | 99/375 |
| 3,842,726 | 10/1974 | Fautz | 99/445 X |
| 4,034,663 | 7/1977 | Jenn et al. | 99/446 |
| 4,403,540 | 9/1983 | Erkelenz | 99/375 |
| 4,972,766 | 11/1990 | Anetsberger | 99/379 X |
| 5,606,905 | 3/1997 | Boehm et al. | 99/400 X |

*Primary Examiner*—Timothy F. Simone
*Attorney, Agent, or Firm*—James J. Ralabate

[57] ABSTRACT

A grill for cooking food is provided that has an inclined cooking surface with diagonally positioned ribs projecting therefrom. The ribs have a rounded elongated configuration that all point toward a liquid drain. The ribs have liquid flow channels there between to facilitate liquid flow down the incline into a collection vessel. The cooking surface is surrounded by a retaining wall for holding food in position during a cooking operation.

18 Claims, 7 Drawing Sheets

ELECTRIC GRILL

The present invention relates to an electric grill and, more particularly, to an improved household grill for cooking meats, fish, poultry, and the like.

BACKGROUND OF THE INVENTION

There are known many various configurations for cooking foods within the house; in particular, portable grills that can be used in the kitchen, family room, or even outdoors, if desired. Many of these grills are difficult to clean after use since the grease generated during cooking accumulates on the cooking surface. Also, many of these grills do not provide for a convenient way to dispose of the resulting grease and residue from the foods cooked. Another difficulty sometimes encountered with prior art grills is the storage space taken up by the grill when not in use. Grills, because of their very nature, must be somewhat dimensionally large in order to provide adequate cooking area or surface. These are some difficulties faced with many prior art grills that the present invention could avoid or minimize.

Some of the prior art electric and other grills are disclosed in U.S. Pat. Nos. 3,369,481; 3,664,256; 3,719,507; 3,938,431; 3,842,726; 4,034,663; and 5,606,905.

In U.S. Pat. No. 3,369,481 (Pappas) a broiler is disclosed which minimizes the excessive flare-up and smoke difficulties associated with this type of broiler. FIG. 1 of Pappas illustrates the structure of his broiler where the grids are inclined downwardly as they approach the front of the broiler. The liquid fat from the foods being broiled drop into U shape channels and flow into the front collecting well 9; thus, the drippings do not contact the heating surface so as to cause excessive smoke. The grids of Pappas are channeled and tapered downwardly to allow a smooth flow of the liquid drippings from the grids to the collection well 9.

In Peirce U.S. Pat. No. 3,664,256, a grill is disclosed which is adapted to assist in the removal of fatty components from the meat that is cooked. Peirce's grill is structured so that a downwardly extending funnel 5 is provided to drain off the liquid fats and flow them into a collection pan 6. This funnel-like surface has a centrally located aperture through which the fat passes into the collection pan 6 as shown in FIG. 5 of Peirce. The ribs or grid of Peirce are somewhat horizontal while the floor of his structure is inclined toward the centrally located aperture 5. The grease collection vessel 6 of Peirce is located in the central portion of his structure which could make its handling somewhat cumbersome.

In U.S. Pat. No. 3,719,507 (Bardeau) a cooking appliance is described where the upper platen has a channel formation and an inclination to the horizontal to assist in the ran-off of greases to the lower structure. A removable collection vessel 46 is provided to collect the greases that result from the cooking operation. The channels and cooking surfaces used in Bardeau could cause some difficulty in cleaning once the grilling is completed. Bardeau's structure comprises a cover section having a lower heat-conducting grilling surface which overlies a base section. The opposed surfaces are contoured such that they mate in overlying relation to define an upper internal cavity for the reception of an article of food to be cooked. The fat and juices drain downwardly through a narrow passage or channel to a collection vessel. These narrow channels could be somewhat difficult to clean.

The electric grill described by Potvin in U.S. Pat. No. 3,938,431 has a main body comprising a bottom wall, opposed side walls and a top plate of heat conductive material. The top plate has an outer cooking surface and an underside facing the bottom wall. The heating element is secured directly to the under surface for heating the top plate. A grease collection or tray 20 is removably secured under the bottom wall to catch the drippings from the meat being cooked. Again, the location of this drip tray 20 could make its removal from the appliance somewhat difficult. Also, since the tray is coextensive with the appliance, it is comparatively large to remove and to handle easily.

The Fautz U.S. Pat. No. 3,842,726 teaches the use of a grill having longitudinal grooves or cooking surface sloped so that food fats that drop into the grooves flow downwardly toward a collection area 68. The cooking surface 12 of Fautz is sloped from rear to front, dropping approximately one inch per foot of groove length. The grooves 18 of this prior art griddle are not even; thus present a difficult cleaning surface. Also, the griddle plate 12 is mounted so as to be removable as an integral unit with the back splashes and the collection trough 68. This construction could present an awkward cleaning process and is comparatively more difficult than other grills.

U.S. Pat. No. 4,034,663 (Jenn) discloses a portable grill having a somewhat L-shaped housing, the horizontally extending portion of which encloses a heating element and is topped by a grill element for supporting meat or other edibles for surface broiling. The upwardly extending portion houses a power driven fan which draws air, smoke and cooking vapors from across the grill element and into an upwardly extending portion. Jenn presents a grate member 12 above a drain pan 41 which has an inclined channeled base to facilitate draining of food fats and juices. The food pan collects the liquids produced during cooking and can only be removed from the structure by removing the grate or cooking surface 12 and channeled base 41B. This presents a complex cleaning process and a problematic surface cleaning of both the grates 12 and the channeled base 41B.

The Boehm U.S. Pat. No. 5,606,905 provides a cooling device having a lower cooking plate which is inclined to facilitate the flow of grease. A movable, upper cooking plate compatible with the lower cooking plate is used to form when closed a cooking chamber. The grilling members 26 extend upwardly from the plane of the lower cooking plate 16 and have their lower marginal end portions 28 extend upwardly to a greater elevation above the lower cooking plate 16 than the elevation of the opposite marginal portions. These upwardly extending portions 28 of the grilling member 26 present foodstuffs from sliding or otherwise moving down and off of the inclined grilling members 26. The inclined surface 24 as in all of the applicable above noted patents facilitates the drainage of liquid fats into a collection vessel. The upwardly extending end portions 28 of Boehm distinguishes this patent from the others of the prior art and provides generally a means for retaining the meat in position on the front portion only on an inclined cooking surface. The grilling members 26 of Boehm are aligned in a parallel fashion which facilitates the upwardly extending retainer means 28.

SUMMARY OF THE INVENTION

It is therefore an object of this invention to provide a portable grill devoid of the above noted disadvantages.

Another object of this invention is to provide a portable grill having an easily cleaned cooking surface with rounded ribs.

A further object of this invention is to provide a grill where the greases are better collected and conveniently disposed of after the grilling operation.

Yet another object of this invention is to provide a grill where the grease collection vessel is conveniently located for better grease collection and easy removal from the grill.

Yet a further object of this invention is to provide a grill having means to provide upright and easy storage of the grill when not in use.

Still another object of this invention is to provide a grill with maximum grilling surface with an absence of hard-to-clean grooves or channels.

Another yet further object of this invention is to provide a grill whereby the meat or other food being cooked is retained on all sides from moving down or laterally on an inclined cooking surface.

These and other objects of this invention are accomplished generally speaking by a portable electric grill having an inclined cooking surface with rounded easily cleaned ribs slightly raised on the face of the cooking surface. Between each of these diagonally-positioned ribs are diagonal channels all pointed or directed toward a semicircular channel, which in turn is directed to a drain aperture located at the lower end of the inclined cooking surface. The diagonal ribs are oblique; i.e. other than a right or straight angle and are substantially parallel to each. They are positioned so as to better hold the meat in position and to direct all liquid fats toward a front drain in the cooking surface. The structure and positioning of these ribs can be clearly seen in the drawings. Around the peripheral portion of the inclined cooking surface is a high retaining wall that prevents the meat or other food from sliding down or sideways on the face of the inclined cooking surface. While prior art grills have means for preventing the meat from sliding down the inclined surfaces (i.e. Boehm), none of the known prior art has means to prevent or minimize the sliding of the meat in all directions as provided for in the present invention. Again, this is accomplished by the oblique ribs and the retaining wall which substantially encircles the cooking surface. This high retaining wall encircles the entire inclined cooking surface except for adjacent the drain, since this opening is needed for the liquid fat to drain through and into the fat collection vessel below it. The upper lid of the electric grill has a configuration that mirror images the lower cooking surface so that each rounded rib on the inner lid surface contacts a correspondingly positioned rib on the lower cooking surface. Thus, the critical features of this invention are:

1. rounded slightly raised ribs—easily cleaned or wiped off;
2. raised ribs diagonally positioned on the cooking surface so that it holds meat in position and all liquids flow via the semi-circular channel to the drain opening in front part of the cooking surface; all ribs point in the direction of the channel and drain as shown in the drawings;
3. A high retaining wall raised is a higher elevation than the surface of the cooking surface, encircling all of the cooking surface except for a small portion adjacent to the drain opening. This retaining wall is distanced from the ribs so as to form a semi-circular channel where liquids will flow toward the drain opening.

These three critical features on the cooking surface provide a substantial improvement over the art and furnish a much more reliable and cleanable electric grill than heretofore available. The heater elements also fit into the interior of the lower cooking surface and lid and are structured to heat both the lid and lower cooking surface; see the drawings for additional clarity.

DETAILED DESCRIPTION OF THE DRAWING AND PREFERRED EMBODIMENTS

Figure 1:
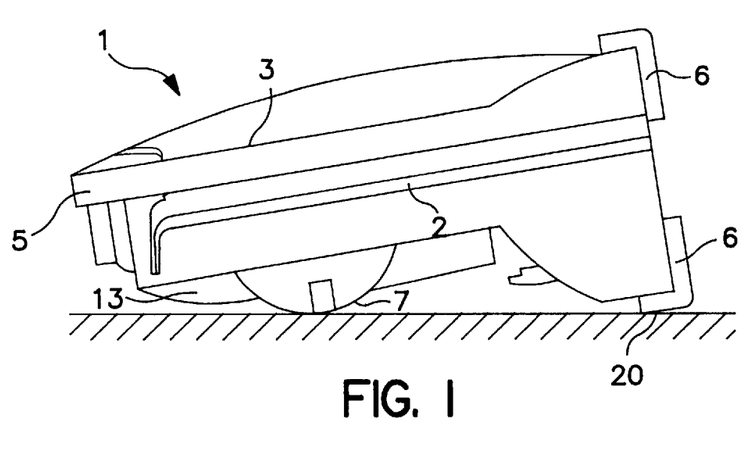
FIG. 1 is a plan side view of the outside configuration of the grill of this invention.
Figure 2:
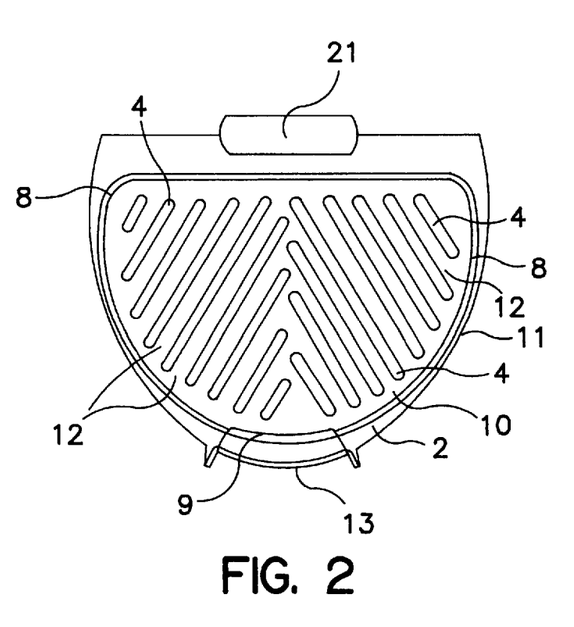
FIG. 2 is a top plan view of the cooking surface of the grill of this invention.
Figure 3:
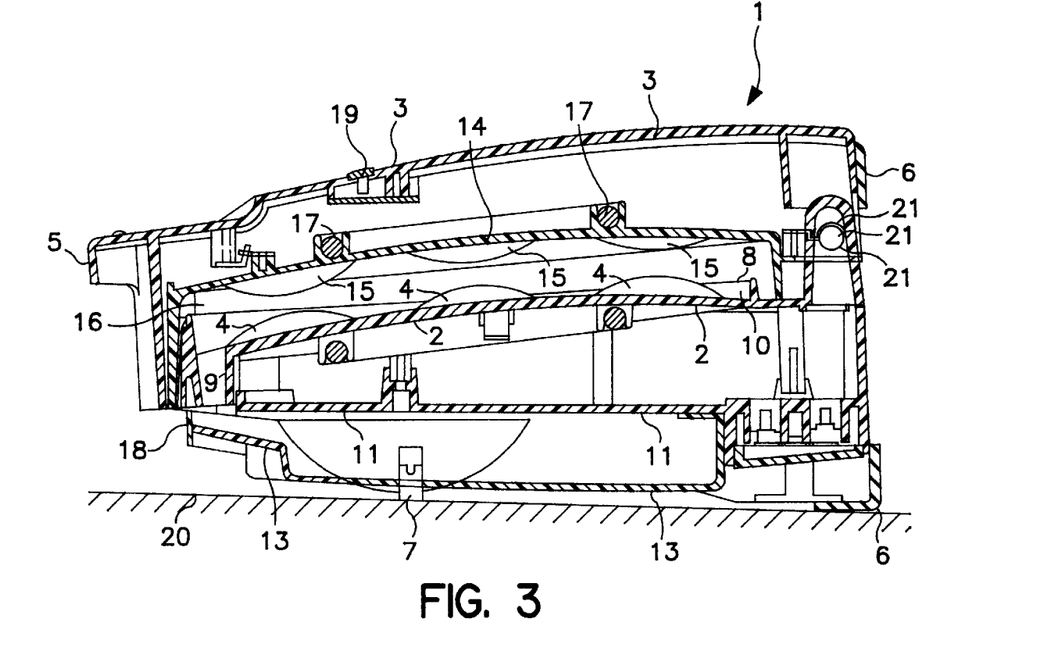
FIG. 3 is a side elevation of the grill of this invention showing the interior features of the grill, including the inclined cooking surface and lid structure.
Figure 5:
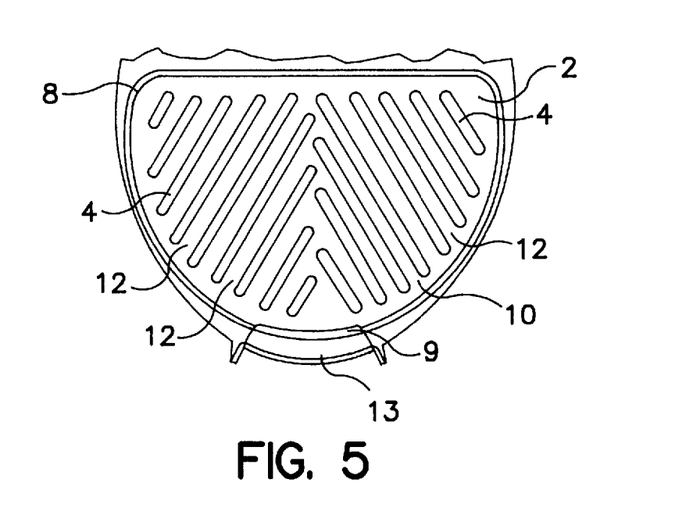
FIG. 5 is a front perspective view of the ribs in relationship to the drain and side retaining walls.
Figure 5A:
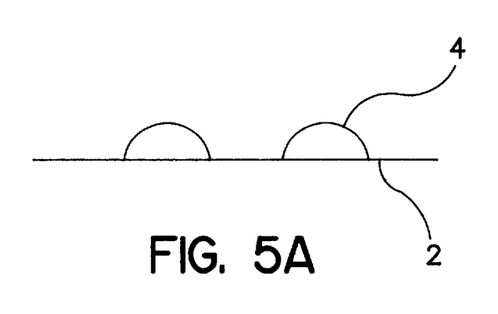
FIG. 5A is a front breakaway view of a rib as it is positioned on the cooking surface.

In FIG. 1 a side view of the grill 1 is shown where the inclined lower cooking surface 2 has approximately the same angle inclination as the contacting lid 3. The ribs 4 and other features are not shown in this figure for clarity. The lid 3 can easily be raised by handle portion 5 located in the front section of grill 1. Rubber feet stands 6 are provided at the back section of grill 1 to be used when storing the grill 1 in a vertical position when not in use. A foot 7 is also provided to be used when grill 1 is in use or in a horizontal position. In FIG. 2 a top view of the novel cooking surface 2 is illustrated having diagonally positioned ribs 4 located thereon all pointing toward the drain peripheral channel 10 and eventually the drain 9. Each of the obliquely positioned ribs 4 are rounded in a cross-sectional mode resembling a semi-circle or less as they protrude upwardly from surface 2. The important feature of the ribs 4 is that they are rounded and extend slightly above the face of the horizontal plane of the cooking surface 2 as shown in FIG. 5A; this provides an easy cleanable cooking surface. Ribs 4 must be diagonally positioned to allow easy draining toward the peripheral drain channel 10 and drain 9 and also provide spacing so that the food liquids pass in oblique drain channels or spaces 12 between each rib 4. On the opposite end of ribs 4 is a semi-circular or peripheral channel 10 located between the end of ribs 4 and retaining wall 8. This channel 10 allows liquids to also flow through this peripheral channel 10 in addition to flowing through oblique channels 12 between ribs 4. Thus, because of the inclined surface of cooking surface 2, the oblique channels 12 between the ribs 4, and the peripheral channel 10 adjacent to the retaining wall 8, the liquid grease easily flows down to drain 9 and empties into a grease collection vessel 13 for eventual removal from the grill 1. The grease collection vessel 13 is conveniently located and removable from beneath the drain 9 by pulling on the front handle 18 of the vessel which extends out from the lower grill portion. Whereas it can be easy for meat to slide down inclined surfaces with raised straight forward ribs as in Boehm U.S. Pat. No. 5,606,905, making the ribs 4 diagonal as in the present invention substantially reduces the sliding on an inclined cooking surface 2. However, the retaining wall 8 in cooperation with diagonal ribs 4 ensures that foods will substantially stay in position. Again, rounding ribs 4 with low profiles as shown in FIGS. 5 and 5A makes cleaning cooking surface 2 much easier, since there are no sharp rib angles or narrow crevices from which grease needs to be removed. The retaining wall 8 also keeps the meat from contacting the inside of the lid or grill housing thereby substantially eliminating another possible cleaning area. In FIG. 3 a breakaway side section of grill 1 is shown so that most of the internal components can be seen; some components such as the entire retaining wall are not shown for clarity in illustrating the other grill components. Grill 1 is shown closed and it has an upper lid 3 which has an inner lid cooking surface 14 or plate 14.

Figure 4:
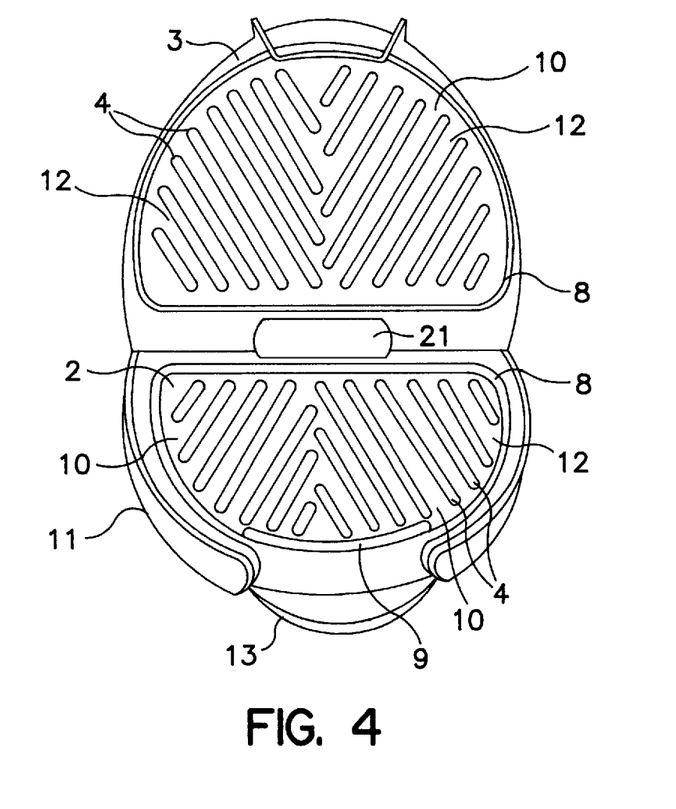
FIG. 4 is a side perspective view of the grill of this invention with the lid opened to illustrate the position of the rounded ribs on the cooking surface and lid.

This surface 14 has projecting lid ribs 15 which are identical to cooking surface ribs 4 except they are a mirror image of ribs 4 (as shown in FIG. 4). When tapered lid 3 is closed, its interior is spaced from the cooking surface 2 to provide thereby a cooking chamber or space 16 which allows for the thickness space of the meat or food being cooked. An electric heating element 17 is located abutting or in the lid 3 and in or abutting the cooking surface 2 so that both surfaces cook the meat or food in contact therewith. The tapered cooking surface 2 terminates at its front portion with a drain 9 through which the liquid grease will flow into a grease catcher or collection vessel 13.

Figure 6:
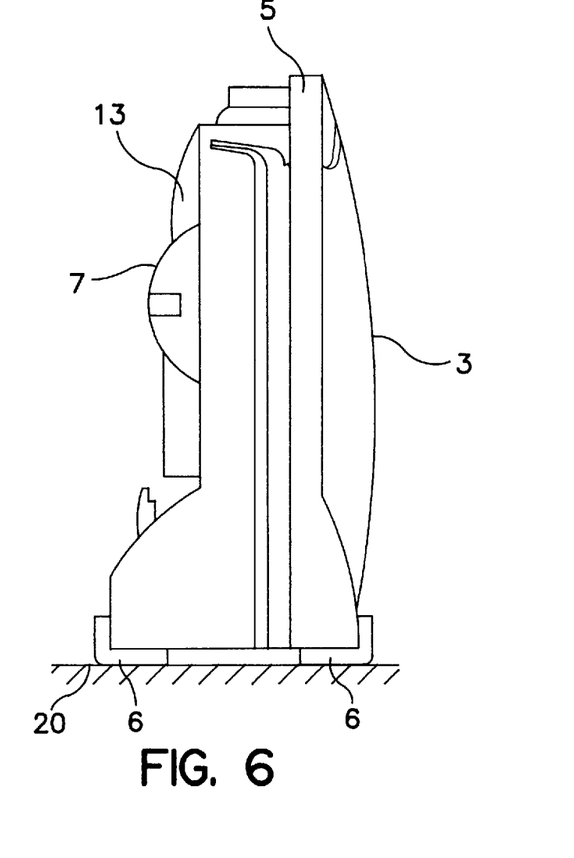
FIG. 6 is a plan side view of the grill of this invention showing the relationship of the inclined cooking surface to the grease collection vessel.

This collection vessel 13 can easily be removed by pulling handle 18 thereby sliding collection vessel 13 out from grill 1 so it may be emptied. A heat sensor signal light 19 could be positioned on the upper outside face of lid 3 to indicate when the food is cooked, or temperature, etc. A portion of the retaining wall 8 can be seen on the back portion cooking surface 2. A hinge component 21 for lifting or closing the lid 3 is shown but can be of any suitable structure. Grill 1 can be made of any suitable material such as plastic for the housing and good conducting materials such as steel or metal for lid inner surface 14 and cooking surface 2. Of course handles such as handle 18 are made from non-conductive materials such as plastics, etc. In FIG. 4 ribs 4 on the inner lid 3 and inclined cooking surface 2 (by "inclined" is meant a surface that slants downwardly from the back to front, with lowest portion in front) are coextensive with each other and are configured so that each will contact the steak or food being grilled. When the lid 3 is closed, a cooking compartment is formed with finger-like ribs 4 and channels 10 and 12 formed for cooking the meat and providing channels for liquids to flow to the drain 9. With the inclined cooking surface 2 and the channels 10 and 12 greases and other liquids are easily separated from the meat or food being grilled. The main housing contains a base 11, which is shown substantially horizontally parallel to a table 20 or other support surface. Central foot 7 and end foot 6 which are made from rubber or other suitable material contact table 20 in supporting grill 1. In FIG. 5 a portion of cooking surface 2 is shown with attention given to the configuration of rounded ribs 4 and channels 12 between said ribs 4. The ribs 4 all point toward drain 9 and thereby direct all liquids to the drain 9. A semi-circular channel 10 located between retaining wall 10 and ribs 4 also directs liquids to drain 9. FIG. 5A shows a front plan view of the low profile ribs 4 on cooking surface 2. A critical feature of this invention is the rounded diagonally disposed ribs 4 all point toward the drain peripheral channel 10 which directs liquids ultimately to the drain 9. Another critical feature of the present invention is the retaining wall 8 which has two functions—one to hold the meat in position and two from peripheral drain channel 10 to facilitate and to direct all juices or liquids to the drain 9. The low oblique profile ribs 4 assist in holding the meat in position and provide easy cleaning because of the lack or absence of deep crevices or cracks where grease can easily collect. FIG. 6 shows the grill 1 when it is stored in a vertical position so as to take up less space in a storage area.

Figure 7:
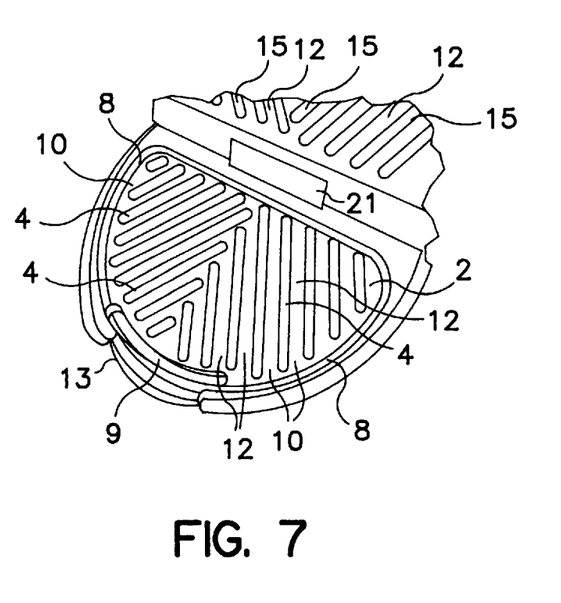
FIG. 7 is a close-up top plan view showing the grill drain in relation to the cooking surface.

In FIG. 7 the cooking surface 2 is shown with diagonal ribs 4 all directed or pointing toward peripheral drain channel 10 and liquid drain 9. Liquid drain 9 is an arch shaped or concave curved opening in the front surface of cooking surface 2 which conveys the drained fats or liquids from the peripheral channel 10 and oblique channels 12 to a liquid collection vessel 13 that is beneath the drain 9. The collection vessel 13 is slidably located in the undersurface of cooking surface 2 immediately under the drain 9.

The preferred and optimumly preferred embodiments of the present invention have been described herein and shown in the accompanying drawings to illustrate the underlying principles of the invention, but it is to be understood that numerous modifications and ramifications may be made without departing from the spirit and scope of this invention.

What is claimed is:

1. An electric grill for cooking food having a lid, a main housing and a removable grease collection vessel, said main housing comprising an inner cooking chamber comprising an inclined cooking surface having thereon diagonally positioned rounded finger configured ribs all pointing toward a first channel which is a semi-circular drain channel that substantially surrounds said cooking surface, said semi-circular drain channel in liquid flow connection to a liquid drain, said drain located at a front portion of said cooking surface, each of said ribs being elongated and having a second flow channel therebetween as means for liquid to flow into said semi-circular drain channel and said liquid drain, said cooking surface having a retaining wall around its peripheral portion and adjacent said semi-circular drain as means for retaining said food in position during a cooking operation, said ribs being rounded and of a low profile to provide for easy cleaning of said cooking surface.

2. The grill of claim 1 wherein said lid has ribs also diagonally positioned so as to be coextensive with said finger configured ribs on said cooking surface and a mirror image thereof when said lid is closed to thereby form said cooking chamber.

3. The grill of claim 1 wherein said retaining wall encloses the entire peripheral portion of said cooking surface except for an opening adjacent said drain.

4. The grill of claim 1 wherein said cooking surface has said semi-circular drain channel positioned between said retaining wall and a terminal portion of said finger configured ribs.

5. The grill of claim 1 wherein a liquid collection vessel is positioned in said main housing below said drain.

6. The grill of claim 1 wherein an electrical heater element is located in said lid and in said inclined cooking surface.

7. The grill of claim 1 wherein said lid is parallel to and inclined at substantially the same angle as the angle of said cooking surface.

8. The grill of claim 1 wherein said drain has means for liquid drainage directly from said cooking surface to a liquid collection vessel, said collection vessel located below said drain and said cooking surface and is slidably removable from said main housing.

9. The grill of claim 1 wherein said main housing has rubberized feet at a widest rear portion of said main housing, said feet usable when said grill is stored in a vertical position.

10. An electric grill for cooking food which comprises in combination a main housing, a lid and a removable grease collection vessel, said main housing comprising an inclined cooking surface having movably attached thereto said lid, said cooking surface having projecting from its surface a plurality of diagonally positioned and rounded finger configured ribs, each of said ribs positioned so as to be pointing toward a first channel defined as a semi-circular drain channel with liquid drain means in flow connection to a liquid drain, each of said ribs having a second liquid flow channel therebetween as means for liquid to be directed toward said semi-circular drain channel and said drain, said cooking surface having a retaining wall around its peripheral portion as means for retaining said food in position during a cooking operation, said ribs being rounded and of a low profile to provide for easy cleaning of said cooking surface.

11. The grill of claim 10 wherein said lid has ribs also diagonally positioned so as to be coextensive with said finger configured ribs on said cooking surface and a mirror image thereof when said lid is closed to thereby form said cooking chamber.

12. The grill of claim 10 wherein said retaining wall encloses the entire peripheral portion of said cooking surface except for an opening adjacent said to said drain.

13. The grill of claim 10 wherein said cooking surface has said semi-circular drain channel positioned between said retaining wall and a terminal portion of said finger configured ribs.

14. The grill of claim 10 wherein a liquid collection vessel is positioned in said main housing below said drain.

15. The grill of claim 10 wherein an electrical heater element is located in said lid and in said inclined cooking surface.

16. The grill of claim 10 wherein said lid is parallel to and inclined at substantially the same angle as the angle of said cooking surface.

17. The grill of claim 10 wherein said drain has means for liquid drainage directly from said cooking surface to a liquid collection vessel, said collection vessel located below said drain and said cooking surface and is slidably removable from said main housing.

18. The grill of claim 10 wherein said main housing has rubberized feet at a widest rear portion of said main housing, said feet usable when said grill is stored in a vertical position.

* * * * *